United States Patent
Zhang et al.

(10) Patent No.: US 11,631,985 B2
(45) Date of Patent: *Apr. 18, 2023

(54) DEVICE TO BE CHARGED WITH MULTIPLE CHARGING CHANNELS, CHARGING METHOD, AND CHARGING CONTROL CIRCUIT WITH MULTIPLE CHARGING CHANNELS

(71) Applicant: GUANGDONG OPPO MOBILE TELECOMMUNICATIONS CORP., LTD., Guangdong (CN)

(72) Inventors: Jun Zhang, Guangdong (CN); Shebiao Chen, Guangdong (CN); Chen Tian, Guangdong (CN); Jialiang Zhang, Guangdong (CN); Jiada Li, Guangdong (CN); Shiming Wan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,775

(22) Filed: Oct. 6, 2021

(65) Prior Publication Data

US 2022/0029440 A1 Jan. 27, 2022

Related U.S. Application Data

(63) Continuation of application No. 16/238,162, filed on Jan. 2, 2019, now Pat. No. 11,171,499, which is a
(Continued)

(51) Int. Cl.
*H01M 10/46* (2006.01)
*H02J 7/00* (2006.01)
*H02J 50/10* (2016.01)

(52) U.S. Cl.
CPC .............. *H02J 7/0068* (2013.01); *H02J 7/00* (2013.01); *H02J 7/007182* (2020.01);
(Continued)

(58) Field of Classification Search
CPC .............. H02J 7/0068; H02J 7/007182; H02J 2207/30; H02J 2207/40; H02J 2207/20; H02J 50/10; H02J 7/00
(Continued)

(56) References Cited

U.S. PATENT DOCUMENTS 5,254,931 A 10/1993 Martensson
5,638,540 A 6/1997 Aldous
(Continued)

FOREIGN PATENT DOCUMENTS

CN 1163500 A 10/1997
CN 102522799 A 6/2012
(Continued)

OTHER PUBLICATIONS

Extended European search report issued in corresponding European application No. 21154573.6 dated Apr. 26, 2021.
(Continued)

*Primary Examiner* — Edward Tso
(74) *Attorney, Agent, or Firm* — Young Basile Hanlon & MacFarlane, P.C.

(57) ABSTRACT

A device to be charged, a charging method, and a charging control circuit are provided. The device to be charged includes multiple cells coupled in series, a conversion circuit, a first charging channel, a second charging channel, and a communication control circuit. The conversion circuit is configured to receive input voltage from a power supply device, convert the input voltage into charging voltage for the multiple cells and into power supply voltage for a system of the device to be charged, charge the multiple cells
(Continued)

according to the charging voltage, and supply power to the system of the device to be charged according to the power supply voltage.

10 Claims, 4 Drawing Sheets

Related U.S. Application Data continuation of application No. PCT/CN2017/080334, filed on Apr. 13, 2017.

(52) U.S. Cl.
CPC .......... *H02J 50/10* (2016.02); *H02J 2207/20* (2020.01); *H02J 2207/30* (2020.01); *H02J 2207/40* (2020.01)

(58) Field of Classification Search
USPC ....... 320/103, 107, 114, 116, 128, 135, 138, 320/140, 162
See application file for complete search history.

(56) References Cited

U.S. PATENT DOCUMENTS

| | | | |
|---|---|---|---|
| 6,326,767 | B1 | 12/2001 | Small et al. |
| 6,329,786 | B1 | 12/2001 | Ono |
| 10,291,050 | B2 | 5/2019 | Zhang et al. |
| 11,056,896 | B2 | 7/2021 | Zhang et al. |
| 11,171,499 | B2 * | 11/2021 | Zhang ..................... H02J 7/00 |
| 2004/0080891 | A1 | 4/2004 | Shyr et al. |
| 2005/0286275 | A1 | 12/2005 | Ryu |
| 2007/0139012 | A1 | 6/2007 | Hayashigawa |
| 2008/0084189 | A1 | 4/2008 | Kim |
| 2009/0027013 | A1 | 1/2009 | Odaohhara |
| 2009/0256529 | A1 | 10/2009 | Wang et al. |
| 2011/0050945 | A1 | 3/2011 | Konno |
| 2011/0193525 | A1 | 8/2011 | Ro |
| 2012/0019190 | A1 | 1/2012 | Jones et al. |
| 2012/0112705 | A1 | 5/2012 | Wang et al. |
| 2013/0002026 | A1 | 1/2013 | Mizutani et al. |
| 2013/0002202 | A1 | 1/2013 | Kuraishi |
| 2014/0009106 | A1 | 1/2014 | Andrea |
| 2014/0084868 | A1 | 3/2014 | Yun et al. |
| 2014/0292278 | A1 | 10/2014 | Wu |
| 2015/0145468 | A1 | 5/2015 | Ma et al. |
| 2015/0198932 | A1 | 7/2015 | Cha |
| 2015/0318721 | A1 | 11/2015 | Watanabe et al. |
| 2016/0064962 | A1 | 3/2016 | Huang et al. |
| 2016/0064979 | A1 | 3/2016 | Huang et al. |
| 2016/0105038 | A1 | 4/2016 | Chi |
| 2016/0239040 | A1 | 8/2016 | Ripley |
| 2017/0040810 | A1 | 2/2017 | Hu et al. |
| 2017/0201109 | A1 | 7/2017 | Meacham, II et al. |
| 2017/0244264 | A1 | 8/2017 | Zhang |

FOREIGN PATENT DOCUMENTS

| | | |
|---|---|---|
| CN | 102723752 A | 10/2012 |
| CN | 101151778 B | 3/2013 |
| CN | 103094939 A | 5/2013 |
| CN | 103580098 A | 2/2014 |
| CN | 203813491 U | 9/2014 |
| CN | 104993565 A | 10/2015 |
| CN | 105098900 A | 11/2015 |
| CN | 205141721 U | 4/2016 |
| CN | 105720645 A | 6/2016 |
| CN | 105762862 A | 7/2016 |
| CN | 105762883 A | 7/2016 |
| CN | 105896670 A | 8/2016 |
| CN | 205544410 U | 8/2016 |
| CN | 105932725 A | 9/2016 |
| CN | 105978049 A | 9/2016 |
| CN | 105978069 A | 9/2016 |
| CN | 106026257 A | 10/2016 |
| CN | 106169798 A | 11/2016 |
| EP | 1066658 A1 | 1/2001 |
| EP | 2879266 A1 | 6/2015 |
| EP | 2887492 A2 | 6/2015 |
| EP | 3131172 A1 | 2/2017 |
| EP | 3334005 A1 | 6/2018 |
| JP | H06024357 U | 3/1994 |
| JP | H07143052 A | 6/1995 |
| JP | H07143683 A | 6/1995 |
| JP | H07177658 A | 7/1995 |
| JP | H09121462 A | 5/1997 |
| JP | H10136573 A | 5/1998 |
| JP | H10256983 A | 9/1998 |
| JP | 2000333377 A | 11/2000 |
| JP | 3091070 U | 1/2003 |
| JP | 2004336974 A | 11/2004 |
| JP | 2005086933 A | 3/2005 |
| JP | 2006302567 A | 11/2006 |
| JP | 2006353010 A | 12/2006 |
| JP | 2007215249 A | 8/2007 |
| JP | 2007288889 A | 11/2007 |
| JP | 2008099370 A | 4/2008 |
| JP | 2008206259 A | 9/2008 |
| JP | 2009033879 A | 2/2009 |
| JP | 2011004509 A | 1/2011 |
| JP | 2011509101 A | 3/2011 |
| JP | 2011139622 A | 7/2011 |
| JP | 2011234486 A | 11/2011 |
| JP | 2012249410 A | 12/2012 |
| JP | 2013183523 A | 9/2013 |
| JP | 2013243844 A | 12/2013 |
| JP | 2014003896 A | 1/2014 |
| JP | 2014087200 A | 5/2014 |
| JP | 2015002068 A | 1/2015 |
| JP | 2015100236 A | 5/2015 |
| JP | 2016509463 A | 3/2016 |
| JP | 2016073066 A | 5/2016 |
| KR | 1020170007814 A | 1/2017 |
| TW | I479774 B | 4/2015 |
| TW | I482391 B | 4/2015 |
| TW | 201535928 A | 9/2015 |
| TW | 201539935 A | 10/2015 |
| TW | I552483 B | 10/2016 |
| WO | 2015185452 A1 | 12/2015 |
| WO | 2016074158 A1 | 5/2016 |
| WO | 2016074391 A1 | 5/2016 |
| WO | 2016074458 A1 | 5/2016 |
| WO | 2016098631 A1 | 6/2016 |
| WO | 2016149999 A1 | 9/2016 |

OTHER PUBLICATIONS

Non final rejection issued in corresponding U.S. Appl. No. 16/238,162 dated Feb. 1, 2021.
International search report with English Translation issued in corresponding international application No. PCT/CN2017/080334 dated Jan. 18, 2018.
Taiwan Office Action with English Translation issued in corresponding TW application No. 107112719 dated Jan. 10, 2019.
First Examination Report issued in corresponding IN application No. 201917000972 dated Mar. 2, 2020.
Notice Of Allowance with English Translation issued in corresponding KR application No. 10-2019-7027259 dated Jul. 27, 2020.
Taiwan first office action with English Translation issued in corresponding TW application No. 106124382 dated Jan. 23, 2018.
Notice of Reasons for Refusal with English Translation issued in corresponding JP application No. 2018-507539 dated Nov. 20, 2020.
Notice of acceptance for patent application issued in corresponding AU application No. 2017297856 dated Aug. 8, 2019.
Japanese Decision to Grant a Patent with English Translation for JP Application 2019545913 dated Nov. 26, 2021. (5 pages).
Chinese Review Decision with English Translation for CN Application 201780041786.3 dated Feb. 28, 2022. (29 pages).

(56) References Cited

OTHER PUBLICATIONS

Indian Hearing Notice for IN Application 201917000972 mailed Feb. 21, 2022. (4 pages).
Japanese Decision to Grant a Patent with English Translation for JP Application 2021137472 dated Nov. 4, 2022. (5 pages).
International Search Report and Written Opinion with English Translation for PCT Application PCT/CN2016/101943 dated Jul. 24, 2017. (17 pages).
U.S. Non-Final office action for U.S. Appl. No. 17/336,563 dated Dec. 6, 2022. (26 pages).
Japanese Decision to Grant a Patent with English Translation for JP Application 2019002131 dated May 12, 2020. (5 pages).
Japanese Decision to Grant a Patent with English Translation for JP Application 2017189123 dated Dec. 11, 2018. (5 pages).
Japanese Notice of Reasons for Refusal with English Translation for JP Application 2017189123 dated Sep. 11, 2018. (10 pages).
Chinese second Office Action with English Translation for CN Application 201710773687.6, dated May 29, 2019 (25 pages).
U.S. Notice of Allowance and fees due for U.S. Appl. No. 15/691,961 dated Mar. 3, 2021. (15 pages).
U.S. Non-Final Rejection for U.S. Appl. No. 15/691,961 dated Jul. 3, 2019. (40 pages).
U.S. Non-Final Rejection for U.S. Appl. No. 15/691,961 dated Apr. 24, 2020. (30 pages).
U.S. Final Rejection for U.S. Appl. No. 15/691,961 dated Jan. 9, 2020. (32 pages).
U.S. Final Rejection for U.S. Appl. No. 15/691,961 dated Nov. 6, 2020. (35 pages).
Communication pursuant to Article 94(3) EPC for EP Application 17189332.4 dated Aug. 23, 2019. (5 pages).
Extended European Search Report for EP Application 21154573.6 dated Apr. 26, 2021. (6 pages).
Taiwan Office Action with English Translation for TW Application 106124382 dated Jan. 23, 2018. (14 pages).
Korean Office Action with English Translation for KR Application 1020170126970 dated Dec. 18, 2019. (16 pages).
Korean Written Decision on Registration with English Translation for KR Application 1020170126970 dated Mar. 16, 2020. (6 pages).
Japanese Notice of Reasons for Refusal with English Translation for JP Application 2019002131 dated Feb. 21, 2020. (10 pages).
Indian Examination Report for IN Application 201734034964 dated Dec. 4, 2019. (5 pages).
Indian Hearing Notice for IN Application 201734034964 mailed Nov. 14, 2022. (2 pages).
Extended European Search Report for EP Application 17189332.4 dated Mar. 7, 2018. (13 pages).
Result of consultation for EP Application 17189332.4 mailed Sep. 22, 2020. (7 pages).
Summons to attend oral proceedings pursuant to Rule 115(1) EPC for EP Application 17189332.4 mailed Jan. 28, 2020 (29 pages).
Communication pursuant to Article 94(3) EPC for EP Application 17189332.4 dated Feb. 25, 2019. (8 pages).
Chinese First Office Action with English Translation for CN Application 201710773687.6 , dated Mar. 25, 2019. (12 pages).
Chinese Third Office Action with English Translation for CN Application 201710773687.6 , dated Aug. 6, 2019. (21 pages).
Chinese fourth Office Action with English Translation for CN Application 201710773687.6 , dated Oct. 8, 2019. (21 pages).
Chinese fifth Office Action with English Translation for CN Application 201710773687.6 , dated May 21, 2020. (10 pages).
Chinese Decision of Rejection with English Translation for CN Application 201710773687.6 , dated Dec. 17, 2019. (17 pages).

* cited by examiner

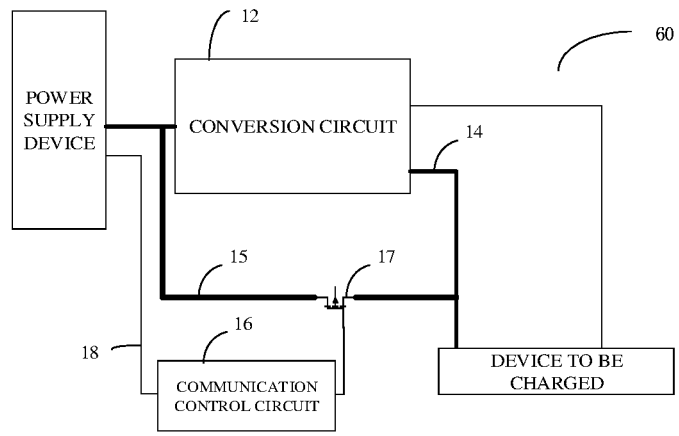
FIG. 6
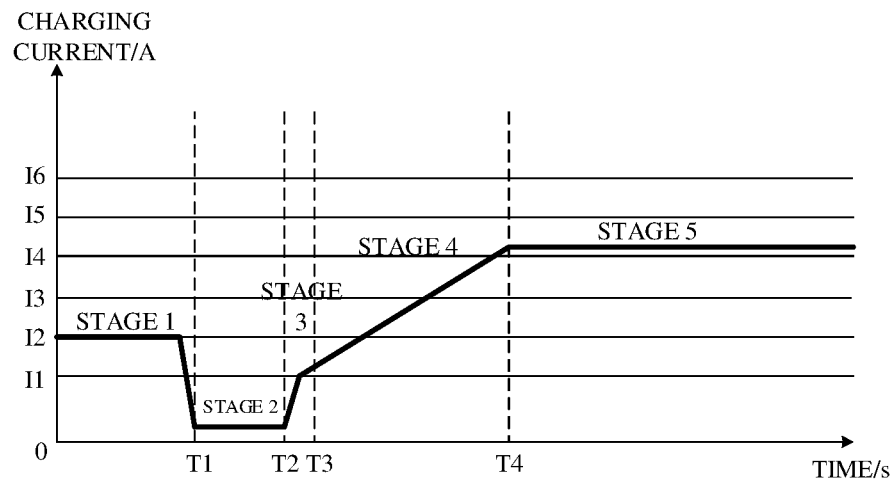
FIG. 7
| COMMUNICATE WITH THE POWER SUPPLY DEVICE TO CONTROL THE OUTPUT VOLTAGE AND/OR THE OUTPUT CURRENT RECEIVED FROM THE POWER SUPPLY DEVICE TO MATCH A CHARGING STAGE OF THE MULTIPLE CELLS, WHEN THE MULTIPLE CELLS ARE CHARGED THROUGH THE SECOND CHARGING CHANNEL | 810 |
FIG. 8

DEVICE TO BE CHARGED WITH MULTIPLE CHARGING CHANNELS, CHARGING METHOD, AND CHARGING CONTROL CIRCUIT WITH MULTIPLE CHARGING CHANNELS

CROSS-REFERENCE TO RELATED APPLICATION(S)

This application is a continuation of U.S. application Ser. No. 16/238,162, which is a continuation of International Application No. PCT/CN2017/080334, filed on Apr. 13, 2017, the disclosures of both of which are hereby incorporated by reference in their entireties.

TECHNICAL FIELD

This disclosure relates to the technical field of charging, and more particularly to a device to be charged and a charging method.

BACKGROUND

With widespread popularity of electronic devices, the electronic device is used increasingly more frequently. Therefore, the electronic device often needs to be charged.

A charging process of the electronic device is accompanied by heating of the electronic devices. Charging the electronic device for a long time can make heat accumulate inside the electronic device, which may in turn result in fault in the electronic device. Therefore, a problem of how to reduce heating in the charging process of the electronic device needs to be solved.

SUMMARY

According to a first aspect of the disclosure, a device to be charged is provided. The device to be charged includes multiple cells coupled in series and a conversion circuit. The conversion circuit is configured to receive input voltage from a power supply device, convert the input voltage into charging voltage for the multiple cells and into power supply voltage for a system of the device to be charged, charge the multiple cells according to the charging voltage, and supply power to the system of the device to be charged according to the power supply voltage. The device to be charged includes a first charging channel and a second charging channel. The conversion circuit is disposed in the first charging channel. Through the second charging channel, the input voltage and input current are received from the power supply device and applied to the plurality of cells to charge the plurality of cells. The device to be charged includes a communication control circuit configured to communicate with the power supply device to control at least one of the input voltage and the input current received from the power supply device to match a present charging stage of the plurality of cells, when the plurality of cells are charged through the second charging.

According to second aspect of the disclosure, a charging method is provided. Communicate with a power supply device to control input voltage and/or the input current received from the power supply device to match a present charging stage of multiple cells coupled in series of a device to be charged, when the multiple cells are charged through a second charging channel of the device to be charged. The device to be charged includes a first charging channel and the second charging channel. The first charging channel and the second charging channel are operable in different charging modes and through the second charging channel, the at least one of input voltage and input current are received from the power supply device and applied to the plurality of cells for charging without conversion.

According to a third aspect of the disclosure, a charging control circuit is provided. The charging control circuit includes a conversion circuit. The conversion circuit is coupled with a power supply device and a device to be charged, the device to be charged includes a plurality of cells coupled in series and a system. The conversion circuit is configured to: receive input voltage from a power supply device, convert the input voltage into charging voltage for the plurality of cells and into power supply voltage for the system of the device to be charged, charge the plurality of cells according to the charging voltage, and supply power to the system of the device to be charged according to the power supply voltage. The charging control circuit further includes a first charging channel, a second charging channel, and a communication control circuit. The conversion circuit is disposed in the first charging channel. Through the second charging channel, the input voltage and input current are received from the power supply device and applied to the plurality of cells to charge the plurality of cells. The communication control circuit is configured to communicate with the power supply device to control at least one of the input voltage and the input current received from the power supply device to be able to be applied in a present charging stage of the plurality of cells, when the plurality of cells are charged through the second charging channel.

BRIEF DESCRIPTION OF DRAWINGS

FIG. 6 is a structural diagram illustrating a charging control circuit according to still another implementation of the present disclosure.

FIG. 7 is a flowchart illustrating a quick charging process according to an implementation of the present disclosure.

FIG. 8 is a schematic flowchart illustrating a charging method according to an implementation of the present disclosure.

DETAILED DESCRIPTION

In implementations of the present disclosure, the device to be charged can be a terminal. The "terminal" can include but is not limited to a device coupled via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or other data connection lines or network connection lines. Examples of the wireless interface may include, but are not limited to, a wireless interface with a cellular network, a wireless local area network (WLAN), a digital television network (such as a digital video broadcasting-handheld (DVB-H) network), a satellite network, an AM-FM broadcast transmitter, and/or with other communication terminals. A communication terminal configured to communicate via a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or other electronic devices equipped with radio telephone capability such as a conventional laptop or a handheld receiver. In addition, in implementations of the present disclosure, the device to be charged or terminal can also include a power bank. The power bank can be charged by the power supply device and thus store energy to charge other electronic devices.

In implementations of the present disclosure, the power supply device can be an adaptor, a power bank, or a computer, etc.

In the following, the expression of "output voltage and/or output current" received from or provided by a power supply device or "input voltage and/or input current" received from or provided by a power supply device means voltage and/or current that is output from the power supply device to a device to be charged. The expression of "A and/or B" means A lone, B alone, or both A and B.

Figure 1:
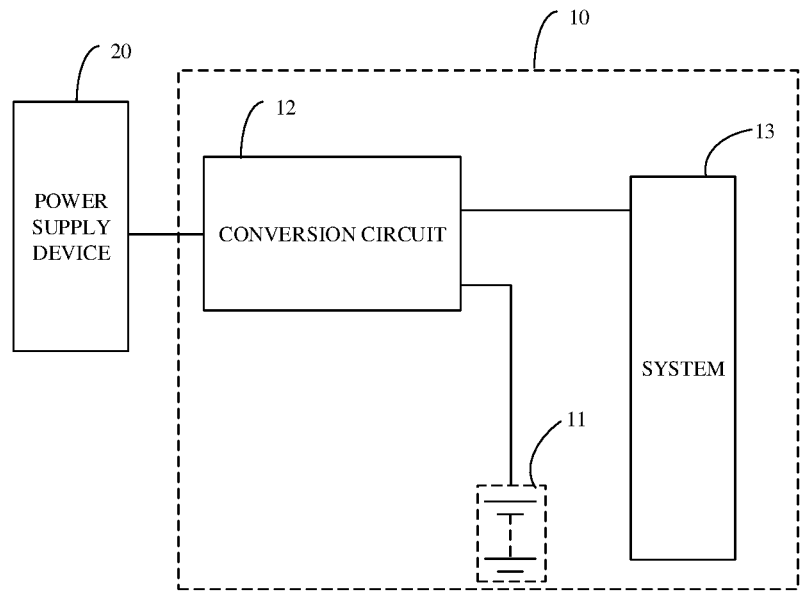
FIG. 1 is a structural diagram illustrating a device to be charged according to an implementation of the present disclosure.

FIG. 1 is a schematic structural diagram illustrating a device to be charged according to an implementation of the present disclosure. A device to be charged 10 illustrated in FIG. 1 includes multiple cells 11 coupled in series, a conversion circuit 12, and a system 13 of the device to be charged 10.

Structure of the cell of the device to be charged is modified in the implementations of the present disclosure. Multiple cells coupled in series are provided. Compared with a single-cell scheme, to achieve an equal charging speed, charging current for the multiple cells is about 1/N time the magnitude of charging current for one single cell, where N represents the number of cells coupled in series of the device to be charged. That is to say, as to an equal charging speed, the technical scheme provided by the disclosure can substantially decrease magnitude of charging current, thereby reducing heating of the device to be charged in the charging process. In addition, based on a multiple-cell scheme, in a charging process, the technical scheme in implementations of the present disclosure controls the system of the device to be charged to take power from the power supply device, which avoids the problem of the device to be charged being unable to be powered on because of excessively low voltage of the multiple cells and improves efficiency in charging in the charging process.

It should be understood that, the system 13 of the device to be charged 10 can refer to components inside the device to be charged 10 which need to be powered by cells. Take a mobile phone as an example. The system of the device to be charged 10 can refer to a processor, a memory, a radio frequency module, a Bluetooth® module, a wireless fidelity (WiFi®) module, etc.

The conversion circuit 12 can be configured to receive input voltage from a power supply device 20, convert the input voltage into charging voltage for the multiple cells 11, and charge the multiple cells 11 according to the charging voltage.

It should be noted that, the manner in which the conversion circuit 12 receives the input voltage is not limited herein.

As an implementation, the device to be charged 10 can include a charging interface. The conversion circuit 12 can be coupled with a power wire of the charging interface. In a charging process, an external power supply device 20 can transmit the input voltage to the conversion circuit 12 through the power wire (such as VBUS) of the charging interface.

The type of the charging interface is not limited herein. For example, the charging interface can be a universal serial bus (USB) interface. The USB interface can be, for example, a USB 2.0 interface, a micro USB interface, or a USB TYPE-C interface. For another example, the charging interface can also be a lightning interface, or other types of parallel interfaces and/or serial interfaces for charging.

As another implementation, the power supply device 20 can charge the device to be charged 10 in a wireless charging manner. The power supply device 20 can send an electromagnetic signal to the device to be charged 10. The conversion circuit 12 can receive the input voltage from the power supply device 20 through a wireless reception circuit inside the device to be charged 10.

Alternatively, in some implementations, the input voltage received from the power supply device 20 can be lower than total voltage of the multiple cells 11. The charging voltage output by the conversion circuit 12 is higher than the total voltage of the multiple cells 11. For instance, the conversion circuit 12 can include a boost circuit, which can increase (in other words, step up) the input voltage received from the power supply device 20.

A conventional device to be charged is usually provided with a single cell. Therefore, a conventional charging scheme is mostly designed for a single cell. In this way, input voltage received from a power supply device is usually unable to satisfy requirements on charging of multiple cells, that is, the input voltage received from the power supply device is usually lower than total voltage of the multiple cells. Take charging of a mobile phone as an example. The power supply device is generally able to provide a 5V input voltage. Voltage of a single cell inside the device to be charged is generally between 3.0V and 4.35V. When a conventional single-cell scheme is adopted, a conversion circuit can utilize directly the 5V input voltage to conduct a constant-voltage control and/or a constant-current control on the single cell without conversion. However, considering that a series multiple-cell scheme is adopted in implementations of the disclosure, the 5V input voltage is unable to satisfy requirements on charging of multiple cells. Take two cells coupled in series as an example. Voltage of a single cell is generally between 3.0V and 4.35V, and then total voltage of the two cells coupled in series is between 6.0V and 8.7V. The 5V input voltage received from the power supply device is obviously unable to be used to charge the two cells. Therefore, the conversion circuit 12 in implementations of the disclosure can first increase the input voltage received from the power supply device and then conduct a constant-voltage control and/or a constant-current control on the multiple cells 11 according to increased voltage to make the charging voltage received from the conversion circuit 12 be higher than the total voltage of the multiple cells 11.

Alternatively, in some implementations, the power supply device 20 can provide directly input voltage which is higher than the total voltage of the multiple cells 11. In this way, the input voltage can be directly used to charge the multiple cells 11 after the conversion circuit 12 adjusts the power supply device 20 (such as conducting the constant-voltage control and/or the constant-current control according to a present charging stage of the multiple cells 11).

The conversion circuit 12 can be further configured to convert the input voltage into a power supply voltage of the system 13 and supply power to the system 13 according to the power supply voltage. It should be understood that, the power supply voltage of the system 13 received from the conversion circuit 12 is not lower than a minimum working voltage of the system 13 and is not higher than a maximum working voltage of the system 13.

To summarize, in order to guarantee charging speed and reduce heating of the device to be charged in the charging process, structure of the cell of the device to be charged is modified in the implementations of the present disclosure. Multiple cells coupled in series are provided. Compared with a single-cell scheme, to achieve an equal charging speed, charging current for the multiple cells is about 1/N time the magnitude of charging current for one single cell, where N represents the number of cells coupled in series of the device to be charged. That is to say, as to an equal charging speed, the multiple cells coupled in series in the implementations of the present disclosure can substantially decrease magnitude of charging current, thereby reducing heating of the device to be charged in the charging process.

In a conventional device to be charged, a cell inside the device to be charged is adopted to supply power to the system, whether it is in a charging process or in a non-charging process. Such a manner will cause the following problems. When the voltage of the cell is low, even if the device to be charged is coupled with an external power supply device, the system of the device to be charged is unable to be powered on until being charged for a period of time, which results in a long waiting time for being powered on. In addition, charging stages of the cell include a constant-current charging stage and a constant-voltage charging stage. Charging current in the constant-voltage charging stage is usually small. When the cell is adopted to supply power while being charged, in case that the cell is in the constant-voltage charging stage, power supply current output by the cell and the charging current in the constant-voltage charging stage may cancel each other out, which leads to the constant-voltage charging stage being prolonged, thereby reducing efficiency in charging of the device to be charged. Although the conventional single-cell scheme can also supply power to the system based on power received from the power supply device during charging, such a scheme is still unable to be applied directly to a multiple-cell architecture.

As illustrated in FIG. 1, in contrast, in implementations of the disclosure, when the multiple cells 11 are charged, the conversion circuit 12 takes power from the power supply device 20 and supplies power to the system 13 of the device to be charged 10 according to the power received from the power supply device 20. In this way, even if voltage of the multiple cells 11 is low, the system 13 can still receive a relatively normal power-on voltage from the power supply device 20, thereby reducing waiting time for being powered-on of the system. In addition, when the multiple cells 11 are charged, the multiple cells 11 does not need to supply power s to the system 13, thereby avoiding the above-mentioned problem of low efficiency in charging resulting from a prolonged constant-voltage charging stage.

The configuration of the conversion circuit 12 is not limited herein. Optionally, in some implementations, take a 5V input voltage received from the power supply device 20 and a power supply voltage of 3.0V to 4.35V required for the system 13 as an example. The conversion circuit 12 can use a buck circuit to directly decrease (in other words, step down) the 5V input voltage to a voltage between 3.0V and 4.35V to supply power to the system 13.

Figure 2:
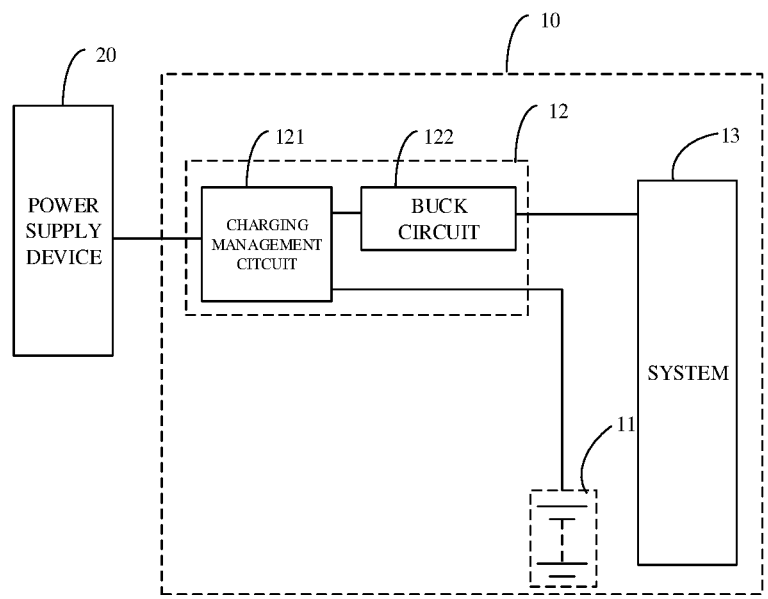
FIG. 2 is a structural diagram illustrating a device to be charged according to another implementation of the present disclosure.

Alternatively, in some implementations, as illustrated in FIG. 2, the conversion circuit 12 can include a charging management circuit 121 and a buck circuit 122.

The charging management circuit 121 can be configured to receive input voltage from the power supply device 20 and convert the input voltage into a charging voltage and to a first voltage. The first voltage is higher than a maximum working voltage of the system 13 of the device to be charged 10.

Figure 4A:
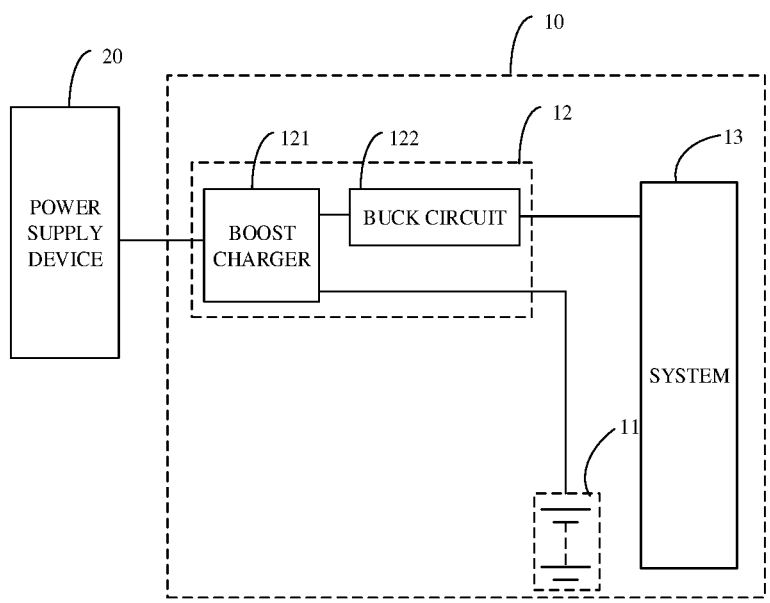
FIG. 4A is a structural diagram illustrating a device to be charged according to still another implementation of the present disclosure.
Figure 4B:
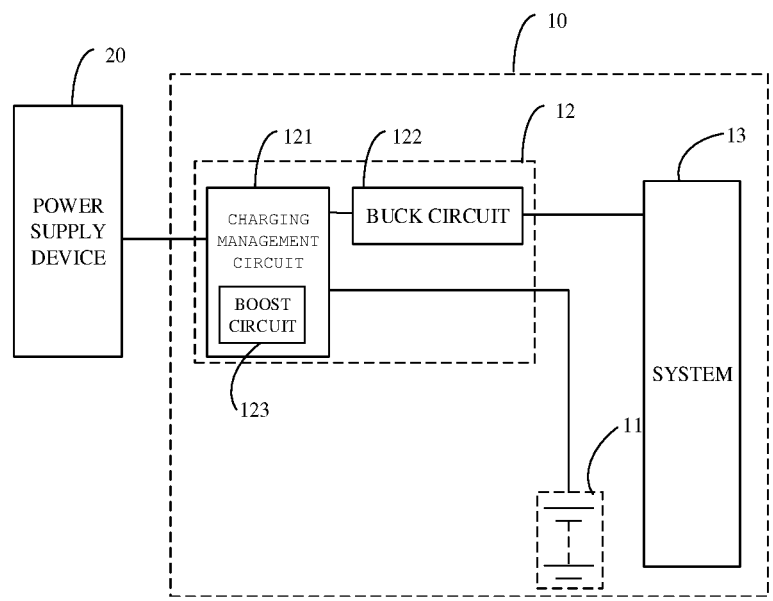
FIG. 4B is a structural diagram illustrating a device to be charged according to still another implementation of the present disclosure.

In some implementations, the charging management circuit 121 can be a charging management circuit with a boost function. As an implementation, the charging management circuit 121 can be a charging integrated circuit (IC) with a boost function, which can also be referred to as a "charger". The boost function can be achieved by, for example, a Boost circuit. Alternatively, conversion circuit 12 can includes a boost circuit 123 which is disposed in the charging management circuit 121. FIG. 4B illustrates an example in which a separate boost circuit 123 is provided.

The buck circuit 122 can be configured to receive the first voltage from the charging management circuit 121 and convert the first voltage into the power supply voltage of the system 13 of the device to be charged 10.

Considering that the first voltage output by the charging management circuit 121 is higher than the maximum working voltage of the system 13 of the device to be charged 10, in implementations of the disclosure, the buck circuit 122 is adopted to buck the first voltage to obtain the power supply voltage required for the system 13.

The manner in which the charging management circuit 121 converts the input voltage into the charging voltage is not limited herein. As an implementation, the charging management circuit 121 can first increase the input voltage received from the power supply device 20 and then converts the increased voltage into the charging voltage that matches a present charging stage of the multiple cells 11. When we use "match" herein, it means that the charging voltage can be applied to or is suitable to be applied to the multiple cells 11 at the present charging stage. The charging stage, as detailed below, can be a trickle charging stage, a constant-current charging stage, and a constant-voltage charging stage, and the like. Certainly, the charging management circuit 121 can also adjust the input voltage received from the power supply device 20 first to make the adjusted voltage match a present charging stage of a single cell and then increase the adjusted voltage to obtain a charging voltage for the multiple cells 11. As another implementation, the input voltage received from the power supply device 20 can be higher than total voltage of the multiple cells 11. The charging management circuit 121 can conduct directly a constant-voltage constant-current control according to the input voltage received from the power supply device 20 to obtain the above charging voltage.

The manner in which the charging management circuit 121 converts the input voltage into the first voltage is not limited herein. As an implementation, the charging management circuit 121 can increase directly the input voltage received from the power supply device 20 to the first voltage. As another implementation, the charging management circuit 121 can use the charging voltage for the multiple cells as the first voltage. As yet another implementation, the input voltage received from the power supply device 20 can be higher than the total voltage of the multiple cells 11. The charging management circuit 121 can use directly the input voltage received from the power supply device as the first voltage. When the input voltage received from the power supply device 20 is excessively high, the charging management circuit 121 can further buck the input voltage received from the power supply device 20 to obtain the first voltage.

As pointed above, the conventional charging scheme is designed for a single cell. In the conventional charging scheme, a single cell is usually adopted to supply power to the system of the device to be charged. Therefore, the working voltage of the system of the device to be charged usually matches the voltage of a single cell. In implementations of the disclosure, a multiple-cell scheme is adopted. The total voltage of the multiple cells 11 can be higher than total voltage of the system 13 of the device to be charged 10. Therefore, before the multiple cells 11 are adopted to supply power to the system 13, the total voltage of the multiple cells 11 are decreased to make decreased voltage satisfy requirements on power supply of the system 13. In the implementation illustrated in FIG. 2, since the buck circuit 122 is coupled to an output end of the charging management circuit 121, to simplify circuit design, the charging management circuit 121 can be equipped with a power path management function to enable the multiple cells 11 to multiplex a buck function of the buck circuit 122 when the multiple cells 11 supply power to the system 13 of the device to be charged 10 in a non-charging process, thereby simplifying design of a charging circuit and a power supply circuit of the device to be charged.

Specifically, the charging management circuit 121 can be further configured to receive a second voltage from the multiple cells 11 and transmit the second voltage to the buck circuit 122, when the device to be charged 10 is not coupled with the power supply device 20. The second voltage is equal to the total voltage of the multiple cells 11, and the second voltage is higher than the maximum working voltage of the system of the device to be charged. The buck circuit 122 can be further configured to convert the second voltage into the power supply voltage of the system 13 of the device to be charged 10.

As mentioned above, the charging management circuit 121 in implementations of the disclosure is the charging management circuit with the power path management function. In a charging stage, the charging management circuit 121 can control the buck circuit 122 to take power from the power supply device. In a non-charging stage, the charging management circuit 121 can control the buck circuit 122 to take power from the multiple cells 11. In other words, implementations of the disclosure can select the most suitable power path to supply power to the system 13 according to actual situations, thereby achieving efficient management and dynamic switch of power paths.

Figure 3:
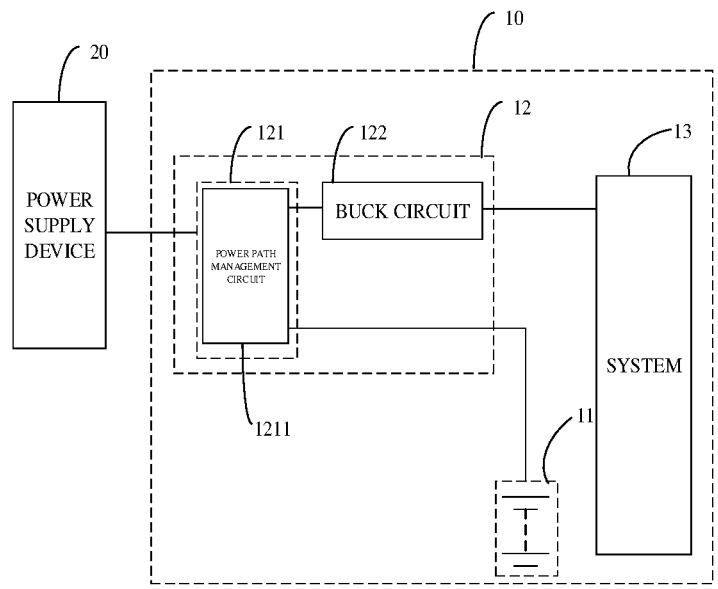
FIG. 3 is a structural diagram illustrating a device to be charged according to yet another implementation of the present disclosure.

The power path management function can be achieved in various manners. As illustrated in FIG. 3, the charging management circuit 121 can be provided with a power path management circuit 1211. The power path management circuit 1211 can be embodied by, for example, a MOS (metal oxide semiconductor) transistor or a diode. The manner of designing the power path management circuit can refer to the related art and will not be repeated herein. The power path management circuit 1211 illustrated in FIG. 3 can be integrated into a charging IC.

The following will describe in detail the buck circuit 122 in conjunction with specific implementations of the disclosure.

Take working voltage of a single cell being between 3.0V and 4.35V as an example. Since the system 13 of the device to be charged 10 is designed based on a single-cell architecture, working voltage of the system 13 is also between 3.0V and 4.35V, that is, a minimum working voltage of the system 13 is generally 3.0V and a maximum working voltage of the system 13 is generally 4.35V. In order to guarantee normal power supply voltage of the system 13, the buck circuit 122 can buck the total voltage of the multiple cells 11 to a value between 3.0V and 4.35V. The buck circuit 122 can be implemented in various manners, such as a Buck circuit, a charge pump, etc.

In order to achieve a simplified circuit, the buck circuit 122 can be a charge pump. With aid of the charge pump, voltage (such as the first voltage or the second voltage mentioned above) input into the buck circuit 122 can be directly decreased to 1/N time the magnitude of present total voltage, where N represents the number of cells included in the multiple cells 11. A conventional Buck circuit includes components such as a switch transistor, an inductor, etc. Since power consumption of the inductor is high, adoption of the Buck circuit to decrease voltage can result in high power consumption. Compared with the Buck circuit, the charge pump mainly utilizes the switch transistor and a capacitor to decrease voltage, where the capacitor consumes nearly no extra energy. Therefore, adoption of the charge pump can reduce power consumption caused by voltage reduction. Specifically, the switch transistor of the charge pump controls charge and discharge of the capacitor in a certain manner and makes the input voltage decrease in a certain factor (such as 1/N) to obtain the power supply voltage required.

The following will describe the implementations of the disclosure in further detail in conjunction with specific examples. It should be noted that, examples illustrated in FIG. 4A are just for those skilled in the art to understand the implementations of the disclosure, instead of limiting the implementations of the disclosure to the specific numeric values or the specific situations of the examples. Those skilled in the art can make various equivalent modifications and changes without departing from the scope of the implementation of the disclosure.

As illustrated in FIG. 4A, a Boost Charger with the power path management function can be used as the charging management circuit 121. A VCC pin of the Boost Charger can be coupled with a VBUS of a charging interface to receive the input voltage (such as 5V) from the power supply device 20. A VBAT pin of the Boost Charger can be coupled with the multiple cells 11 to provide the charging voltage (higher than the total voltage of the multiple cells). The Boost Charger can further include a pin for supplying power to the system 13, to output the first voltage. The first voltage or the second voltage functions as the power supply voltage of the system 13 after being decreased by the buck circuit 122. In addition, the Boost Charger has the power path management function and can control the buck circuit 122 to take power dynamically from the power supply device 20 or the multiple cells 11.

It should be noted that, in the implementation illustrated in FIG. 4A, the buck circuit 122 and the Boost Charger are disposed separately. However, the configuration of the buck circuit 122 and the Boost Charger is not limited herein. In some implementations, the buck circuit 122 can be integrated into the Boost Charger to make voltage output from the pin of the Boost Charger, which can be configured to supply power, satisfy requirements on the power supply voltage of the system 13.

A power supply device configured to charge a device to be charged has been proposed in the related art. The power supply device works in a constant-voltage mode, where voltage output by the power supply device remains nearly constant, such as 5V, 9V, 12V, 20V, etc.

Voltage output by the power supply device is however not suitable for being applied directly to a battery. Instead, the voltage output by the power supply device needs to be converted by a conversion circuit of the device to be charged, so that expected charging voltage and/or charging current of the battery of the device to be charged can be obtained.

The conversion circuit is configured to convert voltage output by the power supply device, so as to meet requirements on expected charging voltage and/or charging current of the battery.

As an implementation, the conversion circuit can be a charging management circuit, such as a charging IC, which, when the battery is charged, is configured to manage the charging voltage and/or charging current of the battery. The conversion circuit functions as a voltage feedback module and/or a current feedback module, so as to achieve management of the charging voltage and/or charging current of the battery.

For example, a charging process of the battery can include at least one of a trickle charging stage, a constant-current charging stage, and a constant-voltage charging stage. In the trickle charging stage, the conversion circuit can utilize a current feedback loop to make current flowing into the battery in the trickle charging stage satisfy expected charging current of the battery (such as a first charging current). In the constant-current charging stage, the conversion circuit can utilize a current feedback loop to make current flowing into the battery in the constant-current charging stage satisfy expected charging current of the battery (such as a second charging current, which may be larger than the first charging current). In the constant-voltage charging stage, the conversion circuit can utilize a voltage feedback loop to make voltage applied to the battery in the constant-voltage charging stage satisfy expected charging voltage of the battery.

As one implementation, when the voltage output by the power supply device is higher than the expected charging voltage of the battery, the conversion circuit can be configured to decrease the voltage output by the power supply device to make decreased charging voltage meet requirements on the expected charging voltage of the battery. As another implementation, when the voltage output by the power supply device is lower than the expected charging voltage of the battery, the conversion circuit can be configured to increase the voltage output by the power supply device to make increased charging voltage meet requirements on the expected charging voltage of the battery.

As yet another implementation, the voltage output by the power supply device is a constant 5V voltage, for example. When the battery includes a single cell (for example, a lithium battery cell, with a 4.2V charging cut-off voltage), the conversion circuit (such as a Buck circuit) can decrease the voltage output by the power supply device to make the decreased charging voltage meet requirements on the expected charging voltage of the battery.

As still another implementation, the voltage output by the power supply device is a constant 5V voltage, for example. When the power supply device charges a battery with two or more single-cells coupled in series (for example, a lithium battery cell, with a 4.2V charging cut-off voltage), the conversion circuit (such as a Boost circuit) can increase the voltage output by the power supply device to make the increased charging voltage meet requirements on the expected charging voltage of the battery.

The conversion circuit is limited by low circuit conversion efficiency, which results in electrical energy that fails to be converted dissipating in the form of heat. The heat can be accumulated inside the device to be charged. Since designed space and heat dissipation space of the device to be charged are both very small, for example, the physical size of a user's mobile terminal is increasingly lighter and thinner, and a large number of electronic components are densely arranged in the mobile terminal to improve performance of the mobile terminal at the same time, difficulty in designing the conversion circuit is increased. In addition, it is difficult to remove promptly heat accumulated inside the device to be charged, which in turn results in abnormality of the device to be charged.

For example, heat accumulated inside the conversion circuit may cause heat interference with electronic components near the conversion circuit, which results in working abnormality of the electronic components. For another example, the heat accumulated inside the conversion circuit may shorten service life of the conversion circuit and the electronic components near the conversion circuit. For yet another example, the heat accumulated inside the conversion circuit may cause heat interference with the battery, which in turn brings about abnormality of charge and discharge of the battery. For still another example, the heat accumulated inside the conversion circuit may raise temperature of the device to be charged and thus influence user experience in the charging process. For still another example, the heat accumulated inside the conversion circuit may result in short circuit of the conversion circuit itself, causing abnormality of charging since the voltage output by the power supply device is applied directly to the battery. In case that the battery is charged with overvoltage for a long time, battery explosion may even occur, thus putting users at risk.

According to implementations of the present disclosure, a power supply device with adjustable output voltage is provided. The power supply device can acquire state information of a battery. The state information of a battery can include present power and/or present voltage of the battery. The power supply device can adjust output voltage of the power supply device itself according to the state information of the battery acquired to meet requirements on expected charging voltage and/or charging current of the battery. Output voltage adjusted by the power supply device can be applied directly to the battery to charge the battery (referred to as "direct charging" hereinafter). In addition, in the constant-current charging stage of the battery, the output voltage adjusted by the power supply device can be applied directly to the battery for charging thereof.

The power supply device can function as a voltage feedback module and/or a current feedback module, so as to achieve management of the charging voltage and/or charging current of the battery.

The power supply device can adjust the output voltage of the power supply device itself according to the state information of the battery acquired as follows. The power supply device can acquire the state information of the battery in real time and adjust the output voltage of the power supply device itself according to real-time state information of the battery acquired each time, so as to meet requirements on the expected charging voltage and/or charging current of the battery.

The power supply device can adjust the output voltage of the power supply device itself according to the real-time state information of the battery acquired as follows. With increase in voltage of the battery in the charging process, the power supply device can acquire current state information of the battery at different time points in the charging process and adjust in real time the output voltage of the power supply device itself according to the current state information of the battery, so as to meet requirements on the expected charging voltage and/or charging current of the battery.

For example, the charging process of the battery can include at least one of the trickle charging stage, the constant-current charging stage, and the constant-voltage charging stage. In the trickle charging stage, the power supply device can output the first charging current in the tricked charging stage to charge the battery, so as to meet requirements on expected charging current (the first charging current can be a constant DC current) of the battery. In the constant-current charging stage, the power supply device can utilize the current feedback loop to make the current output from the power supply device to the battery in the constant-current charging stage meet requirements of the battery on expected charging current, such as the second charging current. The second charging current may be a pulsating waveform current and may be larger than the first charging current, where peak current of the pulsating waveform current in the constant-current charging stage may be greater than magnitude of the constant DC current in the trickle charging stage, and "constant-current" in the constant-current charging stage may refer to a situation where peak current or an average value of the pulsating waveform current remain nearly constant. In the constant-voltage charging stage, the power supply device can utilize the voltage feedback loop to make the voltage output from the power supply device to the device to be charged in the constant-voltage charging stage (that is, constant DC voltage) remain constant.

For example, in implementations of the present disclosure, the power supply device can be mainly configured to control the constant-current charging stage of the battery of the device to be charged. In other implementations, control of the trickle charging stage and the constant-voltage charging stage of the battery of the device to be charged can also be cooperatively completed by the power supply device and an extra charging chip of the device to be charged. Compared with the constant-current charging stage, charging powers of the battery received in the trickle charging stage and in the constant-voltage charging stage are lower, so conversion efficiency loss and heat accumulation of the charging chip of the device to be charged are acceptable. It should be noted that, in implementations of the present disclosure, the constant-current charging stage or the constant-current stage can refer to a charging mode of controlling output current of the power supply device but does not require that the output current of the power supply device remain completely constant, and may be, for example, peak current or an average value of a pulsating waveform current output by the power supply device remaining nearly constant, or remaining nearly constant within a certain time period. Practically, for example, in the constant-current charging stage, the power supply device usually charges the battery in a multi-stage constant current charging manner.

Multi-stage constant current charging can include N constant-current stages, where N is an integer not less than two (N>=2). In the multi-stage constant current charging, a first stage of charging begins with a pre-determined charging current. The N constant-current stages of the multi-stage constant current charging are executed in sequence from the first stage to the $N^{th}$ stage. When a previous constant-current stage ends and a next constant-current stage begins, the peak current or an average value of the pulsating waveform current may decrease. When voltage of the battery reaches a threshold value of charging cut-off voltage, the multi-stage constant current charging proceeds to a subsequent constant-current stage, that is, the previous constant-current stage ends and the next constant-current stage begins. Current conversion between two adjacent constant-current stages may be gradual or in a step-like manner.

In addition, in case that the current output by the power supply device is a pulsating DC current, the constant-current mode can refer to a charging mode of controlling a peak value (that is, peak current) or an average value of the pulsating DC current, that is, controlling the peak value of the current output by the power supply device not greater than magnitude of current corresponding to the constant-current mode. Furthermore, in case that the current output by the power supply device is an AC (alternating current) current, the constant-current mode can refer to a charging mode of controlling a peak value of the AC current.

In addition, in implementations of the present disclosure, when a pulsating waveform voltage output by the power supply device is applied directly to a battery of the device to be charged to charge the battery, charging current can be represented in the form of a pulsating wave (such as a steamed bun wave). It can be understood that, the charging current can charge the battery in an intermittent manner. Period of the charging current can vary with frequency of an input AC such as an AC power grid. For instance, frequency corresponding to the period of the charging current is N times (N is a positive integer) or N times the reciprocal of frequency of a power grid. Furthermore, when the charging current charges the battery in an intermittent manner, current waveform corresponding to the charging current can include one pulse or one group of pulses synchronized with the power grid.

As an implementation, in implementations of the present disclosure, when the battery is charged (such as in at least one of the trickle charging stage, the constant-current charging stage, and the constant-voltage charging stage), the battery can receive a pulsating DC (direction remains constant, and magnitude varies with time), an AC (both direction and magnitude vary with time), or a DC (that is, a constant DC, neither magnitude nor direction varies with time) output by the power supply device.

In order to be compatible with working manners of the power supply device with adjustable output voltage according to implementations of the disclosure and a power supply device of related art, the device to be charged 10 is provided with a first charging channel and a second charging channel in implementations of the disclosure, which will be described in detail hereinafter in conjunction with FIG. 5.

Figure 5:
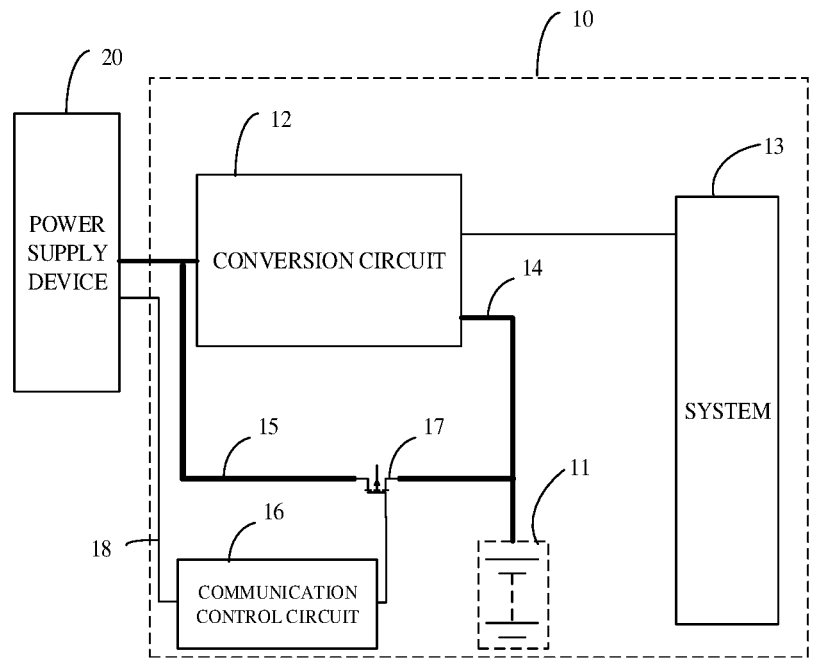
FIG. 5 is a structural diagram illustrating a device to be charged according to still another implementation of the present disclosure.

As illustrated in FIG. 5, the device to be charged 10 can include a first charging channel 14 and a second charging channel 15. The conversion circuit 12 can be disposed in the first charging channel 14. Through the second charging channel 15, output voltage and output current can be received from the power supply device 20 and applied directly to the multiple cells 11 to charge the multiple cells 11. The first charging channel 14 and the second charging channel 15 are operable in different charging modes. Through the second charging channel 15, the at least one of input voltage and input current are received from the power supply device 20 and applied to the plurality of cells 11 for charging without conversion.

In addition, the device to be charged 10 as illustrated in FIG. 5 can further include a communication control circuit 16. When the multiple cells 11 are charged through the second charging channel 15, the communication control circuit 16 is configured to communicate with the power supply device 20 (such as a two-way communication, which can be conducted through, for example, a communication line 18 as illustrated in FIG. 5. The communication line 18 can be, for example, a data line of a communication interface between the power supply device 20 and the device to be charged 10) to control the output voltage and/or the output current received from the power supply device 20, such that the output voltage and/or the output current received from the power supply device 20 match a present charging stage of the multiple cells 11.

For example, when the multiple cells 11 are in a constant-voltage charging stage, the communication control circuit 16 can communicate with the power supply device 20 to control the output voltage and/or the output current received from the power supply device 20, to make the output voltage received from the power supply device 20 match charging voltage corresponding to the constant-voltage charging stage.

For another example, when the multiple cells 11 are in a constant-current charging stage, the communication control circuit 16 can communicate with the power supply device 20 to control the output voltage and/or the output current received from the power supply device 20, to make the output current received from the power supply device 20 match the charging current corresponding to the constant-current charging stage.

In addition, in some implementations, the communication control circuit 16 can be further configured to control switching between the first charging channel 14 and the second charging channel 15. Specifically, as illustrated in FIG. 5, the communication control circuit 16 can be coupled with the second charging channel 15 via a switch 17 and control switching between the first charging channel 14 and the second charging channel 15 by controlling on-off states of the switch 17. For example, the switch 17 can be used to switch on the first charging channel 14 or the second charging channel 15 under control of the communication control circuit 16.

Alternatively, in some implementations, when the power supply device 20 charges the multiple cells 11 through the second charging channel 15, the device to be charged 10 can also supply power to the system 13 according to the input voltage received from the power supply device 20.

Alternatively, in some implementations, the power supply device 20 is selectively operable in a first charging mode or a second charging mode. Charging speed of the power supply device 20 charging the device to be charged 10 in the second charging mode is faster than that of the power supply device 20 charging the device to be charged 10 in the first charging mode. In other words, compared with the power supply device 20 working in the first charging mode, the power supply device 20 working in the second charging mode takes less time to charge battery of the same capacity. In addition, in some implementations, in the first charging mode, the power supply device 20 charges the multiple cells 11 through the first charging channel 14; in the second charging mode, the power supply device 20 charges the multiple cells 11 through the second charging channel 15.

The first charging mode can be a normal charging mode. The second charging mode can be a quick charging mode. In the normal charging mode, the power supply device 20 outputs small current (usually smaller than 2.5 A) or adopts low power (usually lower than 15 W) to charge a battery of the device to be charged. In the normal charging mode, charging fully a battery of high capacity (such as a 3000 mA battery) usually takes several hours. However, in the quick charging mode, the power supply device 20 can output large current (usually larger than 2.5 A, such as 4.5 A, 5 A, or even larger) or adopt higher power (usually higher than or equal to 15 W) to charge the battery of the device to be charged. Compared with the normal charging mode, in the quick charging mode, the power supply device 20 can charge fully the battery of the same capacity within a significantly shorter charging period and at a higher charging speed.

Content communicated between the power supply device 20 and the communication control circuit 16 and control manners of the communication control circuit 16 on output of the power supply device 20 in the second charging mode are not limited herein. For example, the communication control circuit 16 can communicate with the power supply device 20 to interact present total voltage and/or present total power of the multiple cells 11 of the device to be charged, and adjust output voltage and/or output current of the power supply device 20 according to the present total voltage and/or the present total power of the multiple cells 11. The following will describe in detail the content communicated between the communication control circuit 16 and the power supply device 20 and the control manners of the communication control circuit 16 on output of the power supply device 20 in the second charging mode in conjunction with specific implementations of the disclosure.

Description above does not limit master-slave relationship between the power supply device 20 and the device to be charged (or the communication control circuit 16 of the device to be charged). That is to say, any one of the power supply device 20 and the device to be charged can function as a master device to initiate a two-way communication, and correspondingly the other one of the power supply device 20 and the device to be charged can function as a slave device to make a first response or a first reply to the communication initiated by the master device. As one implementation, identities of the master device and the slave device can be determined in a communication process by comparing levels of the power supply device 20 and the device to be charged with reference to earth.

The manner of the two-way communication between the power supply device 20 and the device to be charged is not limited herein. In other words, any one of the power supply device 20 and the device to be charged can function as the master device to initiate the communication, and correspondingly the other one of the power supply device 20 and the device to be charged can function as the slave device to make the first response or the first reply to the communication initiated by the master device. Besides, the master device can make a second response to the first response or the first reply of the slave device, as such, the master device and the slave device complete a negotiation on charging modes. As a possible implementation, charging between the master device and the slave device can be executed after completion of multiple negotiations on charging modes between the master device and the slave device, so as to guarantee that the charging process is safe and reliable after negotiations.

The master device can make the second response to the first response or the first reply to the communication of the slave device as follows. The master device receives from the slave device the first response or the first reply to the communication and make the second response to the first response or the first reply of the slave device. As an example, when the master device receives from the slave device the first response or the first reply to the communication within a preset time period, the master device can make the second response to the first response or the first reply of the slave device as follows. The master device and the slave device complete a negotiation on charging modes. Charging between the master device and the slave device is executed in the first charging mode or in the second charging mode according to the negotiation result, that is, the power supply device 20 is operable in the first charging mode or in the second charging mode to charge the device to be charged according to the negotiation.

The master device making the second response to the first response or the first reply to the communication of the slave device can also include the following. When the master device fails to receive from the slave device the first response or the first reply to the communication within a preset time period, the master device can still make the second response to the first response or the first reply made by the slave device. As an example, when the master device fails to receive from the slave device the first response or the first reply to the communication within a preset time period, the master device can still make the second response to the first response or the first reply made by the slave device as follows: the master device and the slave device complete a negotiation on charging modes. Charging is executed in the first charging mode between the master device and the slave device, that is, the power supply device 20 is operable in the first charging mode to charge the device to be charged.

Alternatively, in some implementations, after the device to be charged, as the master device, initiates the communication and the power supply device 20, as the slave device, makes the first response or the first reply to the communication initiated by the master device, without the device to be charged making the second response to the first response or the first reply of the power supply device 20, it can be regarded as the power supply device 20 and the device to be charged completing a negotiation on charging modes, and thus the power supply device 20 can determine to charge the device to be charged in the first charging mode or in the second charging mode according to the negotiation result.

Alternatively, in some implementations, the communication control circuit 16 can conduct two-way communication with the power supply device 20 through a data line of a charging interface to control output of the power supply device 20 in the second charging mode as follows. The communication control circuit 16 conducts two-way communication with the power supply device 20 to negotiate charging modes between the power supply device 20 and the device to be charged.

Alternatively, in some implementations, the communication control circuit 16 can conduct two-way communication with the power supply device 20 to negotiate charging modes between the power supply device 20 and the device to be charged as follows. The communication control circuit 16 receives a first instruction from the power supply device 20, and the first instruction is configured to enquire whether the device to be charged enables (in other words, switches on) the second charging mode; the communication control circuit 16 sends a reply instruction of the first instruction to the power supply 20, and the reply instruction of the first instruction is configured to indicate whether the device to be charged agrees to enable the second charging mode; in case that the device to be charged agrees to enable the second charging mode, the communication control circuit 16 controls the power supply device 20 to charge the multiple cells though the second charging channel 15.

Optionally, in some implementations, the communication control circuit 16 can conduct two-way communication with the power supply device 20 through the data line to control output of the power supply device 20 in the second charging mode as follows. The communication control circuit 16 conducts two-way communication with the power supply device 20 to determine charging voltage which is output by the power supply device 20 in the second charging mode and configured to charge the device to be charged.

Optionally, in some implementations, the communication control circuit 16 can conduct two-way communication with the power supply device 20 to determine charging voltage which is output by the power supply device 20 in the second charging mode and configured to charge the device to be charged as follows. The communication control circuit 16 receives a second instruction from the power supply device 20, and the second instruction is configured to enquire whether the charging voltage output by the power supply device 20 matches present total voltage of the multiple cells 11 of the device to be charged; the communication control circuit 16 sends a reply instruction of the second instruction to the power supply 20, and the reply instruction of the second instruction is configured to indicate whether the voltage output by the power supply device 20 matches the present total voltage of the multiple cells 11 or does not match, that is, is at higher voltage levels or is at lower voltage levels. Alternatively, the second instruction can be configured to enquire whether it is suitable to use current output-voltage of the power supply device 20 as the charging voltage which is output by the power supply device 20 in the second charging mode and configured to charge the device to be charged. The reply instruction of the second instruction is configured to indicate whether the current output-voltage of the power supply device 20 is suitable or unsuitable, that is, at higher voltage levels or at lower voltage levels. The current output-voltage of the power supply device 20 matching the present total voltage of the multiple cells, or the current output-voltage of the power supply device 20 being suitable to be used as the charging voltage which is output by the power supply device 20 in the second charging mode and configured to charge the device to be charged can be understood as follows. The current output-voltage of the power supply device 20 is slightly higher than the present total voltage of the multiple cells, and difference between the output-voltage of the power supply device 20 and the present total voltage of the multiple cells 11 is within a preset range (usually at a voltage level of several hundred millivolts (mV)).

Optionally, in some implementations, the communication control circuit 16 can conduct two-way communication with the power supply device 20 through the data line to control output of the power supply device 20 in the second charging mode as follows. The communication control circuit 16 conducts two-way communication with the power supply device 20 to determine charging current which is output by the power supply device 20 in the second charging mode and configured to charge the device to be charged.

Optionally, in some implementations, the communication control circuit 16 can conduct two-way communication with the power supply device 20 to determine charging current which is output by the power supply device 20 in the second charging mode and configured to charge the device to be charged as follows. The communication control circuit 16 receives a third instruction from the power supply device 20, and the third instruction is configured to enquire a maximum charging current the device to be charged supports; the communication control circuit 16 sends a reply instruction of the third instruction to the power supply device 20, and the reply instruction of the third instruction is configured to indicate the maximum charging current the device to be charged supports, so that the power supply device 20 can determine the charging current which is output by the power supply device 20 in the second charging mode and configured to charge the device to be charged, according to the maximum charging current the device to be charged supports. It should be understood that, the manner in which the communication control circuit 16 determines the charging current which is output by the power supply device 20 in the second charging mode and configured to charge the device to be charged according to the maximum charging current the device to be charged supports can be various. For example, the power supply device 20 can determine the maximum charging current the device to be charged supports as the charging current which is output by the power supply device 20 in the second charging mode and configured to charge the device to be charged, or comprehensively take into account the maximum charging current the device to be charged supports and other factors such as current output capability of the power supply device 20 itself to determine the charging current which is output by the power supply device 20 in the second charging mode and configured to charge the device to be charged.

Optionally, in some implementations, the communication control circuit 16 can conduct two-way communication with the power supply device 20 through the data line to control output of the power supply device 20 in the second charging mode as follows. The communication control circuit 16 conducts two-way communication with the power supply device 20 to adjust output-current of the power supply device 20 when charging is conducted in the second charging mode.

Specifically, the communication control circuit 16 can conduct two-way communication with the power supply device 20 to adjust the output-current of the power supply device 20 as follows. The communication control circuit 16 receives a fourth instruction from the power supply device 20, and the fourth instruction is configured to enquire present total voltage of the multiple cells; the communication control circuit 16 sends a reply instruction of the fourth instruction to the power supply device 20, and the reply instruction of the fourth instruction is configured to indicate the present total voltage of the multiple cells, so that the power supply device 20 can adjust the output-current of the power supply device 20 according to the present total voltage of the multiple cells.

Optionally, in some implementations, the communication control circuit 16 can conduct two-way communication with the power supply device 20 through the data line to control output of the power supply device 20 in the second charging mode as follows. The communication control circuit 16 conducts two-way communication with the power supply device 20 to determine whether there is contact failure in the charging interface.

Specifically, the communication control circuit 16 can conduct two-way communication with the power supply device 20 to determine whether there is contact failure in the charging interface as follows. The communication control circuit 16 receives a fourth instruction from the power supply device 20, and the fourth instruction is configured to enquire present voltage of the battery of the device to be charged; the communication control circuit 16 sends a reply instruction of the fourth instruction to the power supply device 20, and the reply instruction of the fourth instruction is configured to indicate the present voltage of the battery of the device to be charged, so that the power supply device 20 can determine whether there is contact failure in the charging interface according to output voltage of the power supply 20 and the present voltage of the battery of the device to be charged. For instance, in case that the power supply device 20 determines that difference between the output voltage of the power supply device 20 and the present voltage of the battery of the device to be charged is greater than a preset voltage threshold value, it indicates that impedance, which is obtained by dividing the difference (that is, the difference between the output voltage of the power supply device 20 and the present voltage of the battery of the device to be charged) by output-current of the power supply device 20, is greater than a preset impedance threshold value, and thus it can be determined that there is contact failure in the charging interface.

Optionally, in some implementations, contact failure in the charging interface can be determined by the device to be charged. For example, the communication control circuit 16 sends a sixth instruction to the power supply device 20, and the sixth instruction is configured to enquire output-voltage of the power supply device 20; the communication control circuit 16 receives a reply instruction of the sixth instruction from the power supply device 20, and the reply instruction of the sixth instruction is configured to indicate the output-voltage of the power supply device 20; the communication control circuit 16 determines whether there is contact failure in the charging interface according to present voltage of the battery and the output-voltage of the power supply 20. When the communication control circuit 16 determines that there is contact failure in the charging interface, the communication control circuit 16 can send a fifth instruction to the power supply device 20, and the fifth instruction is configured to indicate contact failure in the charging interface. After receiving the fifth instruction, the power supply device 20 can exit the second charging mode.

It should be noted that, although the above technical schemes are described in a charging system environment in which the power supply device and the device to be charged are involved, manners in which charging control concept of the present disclosure are implemented are not limited. For example, a charging control circuit 60 as illustrated in FIG. 6 is provided, the charging control circuit 60 can be independent from the device to be charged and can be assembled into the device to be charged after delivering from the factory. The charging control circuit 60 can adopt relevant configuration described above and will not be detailed herein again. The charging control circuit can include one or more of the conversion circuit 12, the charging management circuit 121, the buck circuit 122, the power management circuit 1211, the boost circuit 123, the communication control circuit 16, the switch 17, the first charging channel 14 and the second charging channel 15 illustrated in FIGS. 1-5 for example.

The following will describe in further detail a communication process between the power supply device and the device to be charged (the communication process can be executed by a control unit of the device to be charged for example) in conjunction with FIG. 7. It should be noted that, the example of FIG. 7 is just for those skilled in the art to understand the implementations of the disclosure, rather than limiting the implementations of the disclosure to specific numeric values or specific situations of the example. Those skilled in the art can conduct various modifications and equivalent arrangements without departing from the scope of the implementation of the disclosure.

As illustrated in FIG. 7, a communication procedure between the power supply device and the device to be charged (also referred to as a communication procedure of a quick charging process) can include the following five stages.

Stage 1:

After the device to be charged is coupled with power supply equipment, the device to be charged can detect the type of the power supply equipment though data line D+ and data line D−. When the power supply equipment is detected to be a power supply device, current absorbed by the device to be charged can be greater than a preset current threshold value I2 (can be 1 A, for example). When the power supply device detects that output-current of the power supply device is greater than or equal to I2 within a preset duration (can be a continuous time period T1, for example), the power supply device can consider that identification of the type of the power supply equipment by the device to be charged is completed. Next, the power supply device begins a negotiation process with the device to be charged and sends Instruction 1 (corresponding to the first instruction mentioned above) to the device to be charged, so as to enquire whether the device to be charged agrees that to be charged by the power supply device in the second charging mode.

When the power supply device receives a reply instruction of Instruction 1 from the device to be charged and the reply instruction of Instruction 1 indicates that the device to be charged disagrees to be charged by the power supply device in the second charging mode, the power supply device detects once again the output-current of the power supply device. When the output-current of the power supply device is still larger than or equal to I2 within a preset continuous duration (can be a continuous time period T1, for example), the power supply device sends once again Instruction 1 to the device to be charged to enquire whether the device to be charged agrees to be charged by the power supply device in the second charging mode. The power supply device repeats the above operations at Stage 1 until the device to be charged agrees to be charged by the power supply device in the second charging mode, or the output-current of the power supply device is no longer larger than or equal to I2.

When the device to be charged agrees to be charged by the power supply device in the second charging mode, the communication procedure proceeds to Stage 2.

Stage 2:

The output voltage of the power supply device can include multiple grades. The power supply device sends Instruction 2 (corresponding to the second instruction mentioned above) to the device to be charged to enquire whether the output voltage of the power supply device (current output-voltage) matches present voltage of the battery (present total voltage of the multiple cells) of the device to be charged.

The device to be charged sends a reply instruction of Instruction 2 to the power supply device to indicate whether the output voltage of the power supply device matches the present voltage of the battery (the present total voltage of the multiple cells) of the device to be charged, is at higher voltage levels or is at lower voltage levels. When the reply instruction of Instruction 2 indicates that the output voltage of the power supply device is at higher voltage levels or is at lower voltage levels, the power supply device can adjust the output voltage of the power supply device by one grade and send once again Instruction 2 to the device to be charged to enquire whether the output voltage of the power supply device matches the present voltage of the battery (the present total voltage of the multiple cells). Repeat the above steps of stage 2 until the device to be charged determines that the output voltage of the power supply device matches the present voltage of the battery (the present total voltage of the multiple cells) of the device to be charged and proceed to Stage 3.

Stage 3:

The power supply device sends Instruction 3 (corresponding to the third instruction mentioned above) to the device to be charged to enquire a maximum charging current the device to be charged supports. The device to be charged sends a reply instruction of Instruction 3 to the power supply device to indicate the maximum charging current the device to be charged supports. Proceed to Stage 4.

Stage 4:

The power supply device determines, according to the maximum charging current the device to be charged supports, the charging current which is output by the power supply device in the second charging mode and configured to charge the device to be charged. Proceed to Stage 5, that is, the constant-current charging stage.

Stage 5:

After proceeding to the constant-current charging stage, the power supply device can send Instruction 4 (corresponding to the fourth instruction mentioned above) to the device to be charged at certain time intervals, to enquire the present voltage of the battery (the present total voltage of the multiple cells) of the device to be charged. The device to be charged can send a reply instruction of Instruction 4 to the power supply device to feed back the present voltage of the battery (the present total voltage of the multiple cells). The power supply device can determine whether the charging interface is in a good contact and whether it is necessary to decrease the output current of the power supply device, according to the present voltage of the battery (the present total voltage of the multiple cells). When the power supply device determines that there is contact failure in the charging interface, the power supply device can send Instruction 5 (corresponding to the fifth instruction mentioned above), thereby exiting the second charging mode and being reset to return to Stage 1.

Optionally, in some implementations, at Stage 1, when the device to be charged sends the reply instruction of Instruction 1, the reply instruction of Instruction 1 can carry path impedance data (or information) of the device to be charged. The path impedance data of the device to be charged can be used to determine whether the charging interface is in a good contact at Stage 5.

Alternatively, in some implementations, at Stage 2, duration from when the device to be charged agrees to be charged by the power supply device in the second charging mode to when the power supply device adjusts the output voltage thereof to a suitable charging voltage can be controlled within a certain range. When the duration is beyond the certain range, the power supply device or the device to be charged can determine that the communication process is abnormal, then reset and return to Stage 1.

Optionally, in some implementations, at Stage 2, when the output voltage of the power supply device is higher than the present voltage of the battery (the present total voltage of the multiple cells) of the device to be charged by $\Delta V$ ($\Delta V$ can be set as between 200 mV and 500 mV), the device to be charged can send the reply instruction of Instruction 2 to the power supply device to indicate that the output voltage of the power supply device matches the voltage of the battery (the total voltage of the multiple cells) of the device to be charged.

Optionally, in some implementations, at Stage 4, adjusting rate of the output current of the power supply device can be controlled within a certain range, so as to avoid abnormality of the charging process resulting from excessively high adjusting rate.

Optionally, in some implementations, at Stage 5, change magnitude of the output current of the power supply device can be controlled within 5%.

Optionally, in some implementations, at Stage 5, the power supply device can monitor in real time impedance of charging path. Specifically, the power supply device can monitor path impedance of a charging circuit according to the output voltage and the output current of the power supply device and the present voltage of the battery (the present total voltage of the multiple cells) fed back by the device to be charged. When path impedance of the charging circuit is higher than path impedance of the device to be charged plus impedance of a charging cable, it indicates that there is contact failure in the charging interface, and thus the power supply device stops charging the device to be charged in the second charging mode.

Optionally, in some implementations, after the power supply device enables the second charging mode to charge the device to be charged, time intervals of communication between the power supply device and the device to be charged can be controlled within a certain range, to avoid abnormality of communication resulting from excessively short time intervals of communication.

Optionally, in some implementations, stopping of the charging process (or stopping charging the device to be charged by the power supply device in the second charging mode) can include a recoverable stopping and a non-recoverable stopping.

For example, when it is detected that the battery (the multiple cells) of the device to be charged is fully charged or there is contact failure in the charging interface, the charging process stops, a charging communication process is reset, and the charging process enters again to Stage 1. Then, when the device to be charged disagrees to be charged by the power supply device in the second charging mode, the communication procedure will not proceed to Stage 2. The stopping of the charging process in this case can be considered as the non-recoverable stopping.

For another example, when there is abnormality of the communication between the power supply device and the device to be charged, the charging process stops, the charging communication process is reset, and the charging process enters again to Stage 1. After requirements on Stage 1 are satisfied, the device to be charged agrees to be charged by the power supply device in the second charging mode to recover the charging process. The stopping of the charging process in this case can be considered as the recoverable stopping.

For yet another example, when the device to be charged detects abnormality of the battery (the multiple cells), the charging process stops and reset to enter again to Stage 1. Then, the device to be charged disagrees that the power supply device charges the device to be charged in the second charging mode. After the battery (the multiple cells) returns to normal and the requirements on Stage 1 are satisfied, the device to be charged agrees to be charged by the power supply device in the second charging mode. The stopping of the quick charging process in this case can be considered as the recoverable stopping.

The above communication steps or operations of FIG. 7 are just illustrative. For instance, at Stage 1, after the device to be charged is coupled with the power supply device, handshake communication between the device to be charged and the power supply device can also be initiated by the device to be charged. In other words, the device to be charged sends Instruction 1, to enquire whether the power supply device enables the second charging mode. When the device to be charged receives a reply instruction from the power supply device indicating that the power supply device agrees to charge the device to be charged in the second charging mode, the power supply device begins to charge the battery (the multiple cells) of the device to be charged in the second charging mode.

For another instance, after Stage 5, the communication procedure can further include the constant-voltage charging stage. Specifically, at Stage 5, the device to be charged can feed back the present voltage of the battery (the present total voltage of the multiple cells) to the power supply device. When the present voltage of the battery (the present total voltage of the multiple cells) reaches a threshold value of charging voltage in the constant-voltage charging stage, the charging stage turns to the constant-voltage charging stage from the constant-current charging stage. In the constant-voltage charging stage, the charging current gradually decreases. When the charging current decreases to a certain threshold value, it indicates that the battery (the multiple cells) of the device to be charged is fully charged, and thus the whole charging process is completed.

Apparatus implementations of the disclosure are described in detail above in conjunction with FIG. 1 to FIG. 7. The following will describe in detail method implementations of the disclosure in conjunction with FIG. 8. It should be understood that, description of method and description of apparatus correspond to each other. For simplicity, repeated description will be properly omitted.

According to implementations of the disclosure, a charging method is provided, which includes: communicating with a power supply device to control at least one of input voltage and input current received from the power supply device to match a present charging stage of a plurality of cells coupled in series of a device to be charged, when the plurality of cells are charged through a second charging channel of the device to be charged; the device to be charged includes a first charging channel and the second charging channel. The first charging channel and the second charging channel are operable in different charging modes and through the second charging channel, the at least one of input voltage and input current are received from the power supply device and applied to the plurality of cells for charging without conversion.

FIG. 8 is a schematic flowchart illustrating a charging method according to an implementation of the present disclosure. The charging method illustrated in FIG. 8 is applicable to a device to be charged (such as the device to be charged 10 mentioned above). The device to be charged includes multiple cells coupled in series, a conversion circuit, a first charging channel, and a second charging channel. The conversion circuit is configured to receive input voltage from a power supply device, convert the input voltage into charging voltage for the multiple cells and into power supply voltage for a system of the device to be charged, charge the multiple cells according to the charging voltage, and supply power to the system of the device to be charged according to the power supply voltage. The conversion circuit is disposed in the first charging channel. Through the second charging channel, output voltage and/or output current are received from the power supply device and applied to the multiple cells to charge the multiple cells without conversion. The method as illustrated in FIG. 8 includes the following operations.

At 810, communicate with the power supply device to control the output voltage and/or the output current received from the power supply device to match a present charging stage of the multiple cells, when the multiple cells are charged through the second charging channel.

Optionally, in some implementations, the conversion circuit includes a charging management circuit and a buck circuit. The charging management circuit is configured to receive the input voltage and convert the input voltage into the charging voltage and to a first voltage. The first voltage is higher than a maximum working voltage of the system of the device to be charged. The buck circuit is configured to receive the first voltage and convert the first voltage into the power supply voltage of the system of the device to be charged.

Optionally, in some implementations, the charging management circuit is further configured to receive a second voltage from the multiple cells and transmit the second voltage to the buck circuit, when the device to be charged is not coupled with the power supply device. The second voltage is equal to total voltage of the multiple cells, and the second voltage is higher than the maximum working voltage of the system of the device to be charged. The buck circuit is further configured to convert the second voltage into the power supply voltage of the system of the device to be charged.

Optionally, in some implementations, the buck circuit is implemented with a charge pump.

Optionally, in some implementations, the input voltage provided by the power supply device is lower than the total voltage of the multiple cells. The charging management circuit includes a Boost circuit and a charging IC.

Optionally, in some implementations, the Boost circuit and the charging IC is integrated into the same chip.

Optionally, in some implementations, the method as illustrated in FIG. 8 can further include controlling switching between the first charging channel and the second charging channel, that is, selecting one of the first charging channel and the second charging channel for charging.

In one implementation, the method may further include: negotiating with the power supply device a charging mode for the device to be charged; switching on the second charging channel when a quick charging mode is to be enabled.

In one implementation, the method may further include: increasing the input voltage received from the power supply device when the input voltage is lower than total voltage of the plurality of cells.

In one implementation, at least one of the input voltage and the input current provided by the power supply device are controlled according to present total voltage or present total power of the plurality of cells.

All or part of the above implementations can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

Those of ordinary skill in the art will appreciate that units (including sub-units) and algorithmic operations of various examples described in connection with implementations herein can be implemented by electronic hardware or by a combination of computer software and electronic hardware. Whether these functions are performed by means of hardware or software depends on the application and the design constraints of the associated technical solution. A professional technician may use different methods with regard to each particular application to implement the described functionality, but such methods should not be regarded as lying beyond the scope of the disclosure.

It will be appreciated that the systems, apparatuses, and methods disclosed in implementations herein may also be implemented in various other manners. For example, the above apparatus implementations are merely illustrative, e.g., the division of units (including sub-units) is only a division of logical functions, and there may exist other ways of division in practice, e.g., multiple units (including sub-units) or components may be combined or may be integrated into another system, or some features may be ignored or not included. In other respects, the coupling or direct coupling or communication connection as illustrated or discussed may be an indirect coupling or communication connection through some interface, device or unit, and may be electrical, mechanical, or otherwise.

Separated units (including sub-units) as illustrated may or may not be physically separated. Components or parts displayed as units (including sub-units) may or may not be physical units, and may reside at one location or may be distributed to multiple networked units. Some or all of the units (including sub-units) may be selectively adopted according to practical needs to achieve desired objectives of the disclosure.

Additionally, various functional units (including sub-units) described in implementations herein may be integrated into one processing unit or may be present as a number of physically separated units, and two or more units may be integrated into one.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A device to be charged, comprising:
   a plurality of cells coupled in series;
   a conversion circuit, configured to receive input voltage from a power supply device, convert the input voltage into charging voltage for the plurality of cells and into power supply voltage for a system of the device to be charged, charge the plurality of cells according to the charging voltage, and supply power to the system of the device to be charged according to the power supply voltage;
   a first charging channel, in which the conversion circuit is disposed;
   a second charging channel, through which the input voltage and input current are received from the power supply device and applied to the plurality of cells to charge the plurality of cells; and
   a communication control circuit, configured to communicate with the power supply device to control at least one of the input voltage and the input current received from the power supply device to match a present charging stage of the plurality of cells, when the plurality of cells are charged through the second charging channel.

2. The device to be charged of claim 1, wherein the conversion circuit comprises:
   a charging management circuit, configured to receive the input voltage and convert the input voltage into the charging voltage and to a first voltage, the first voltage being higher than a maximum working voltage of the system of the device to be charged; and
   a buck circuit, configured to receive the first voltage and convert the first voltage into the power supply voltage for the system of the device to be charged.

3. The device to be charged of claim 2, wherein
   the charging management circuit is further configured to receive a second voltage from the plurality of cells and transmit the second voltage to the buck circuit when the device to be charged is not coupled with the power supply device, wherein the second voltage is equal to total voltage of the plurality of cells, and the second voltage is higher than the maximum working voltage of the system of the device to be charged; and
   the buck circuit is further configured to convert the second voltage into the power supply voltage for the system of the device to be charged.

4. The device to be charged of claim 2, wherein the buck circuit is implemented with a charge pump.

5. The device to be charged of claim 2, wherein the charging management circuit further comprises a boost circuit and the boost circuit is configured to:
   increase the input voltage received from the power supply device when the input voltage is lower than total voltage of the plurality of cells.

6. The device to be charged of claim 1, wherein the power supply voltage is greater than a minimum working voltage of the system of the device to be charged and less than a maximum working voltage of the system of the device to be charged.

7. A charging control circuit, comprising:
   a conversion circuit, coupled with a power supply device and a device to be charged, the device to be charged comprising a plurality of cells coupled in series and a system, the conversion circuit being configured to:
   receive input voltage from a power supply device;
   convert the input voltage into charging voltage for the plurality of cells and into power supply voltage for the system of the device to be charged;
   charge the plurality of cells according to the charging voltage; and
   supply power to the system of the device to be charged according to the power supply voltage;
   a first charging channel, in which the conversion circuit is disposed;
   a second charging channel, through which the input voltage and input current are received from the power supply device and applied to the plurality of cells to charge the plurality of cells; and
   a communication control circuit, configured to communicate with the power supply device to control at least one of the input voltage and the input current received from the power supply device to be able to be applied in a present charging stage of the plurality of cells, when the plurality of cells are charged through the second charging channel.

8. The charging control circuit of claim 7, wherein the conversion circuit comprises:
   a charging management circuit, configured to receive the input voltage and convert the input voltage into the charging voltage and to a first voltage, the first voltage being higher than a maximum working voltage of the system of the device to be charged; and
   a buck circuit, configured to receive the first voltage and decrease the first voltage into the power supply voltage for the system of the device to be charged.

9. The charging control circuit of claim 8, wherein
   the charging management circuit is further configured to:
   receive a second voltage from the plurality of cells; and
   transmit the second voltage to the buck circuit, when the device to be charged is not coupled with the power supply device; the second voltage being equal to total voltage of the plurality of cells, and the second voltage being higher than the maximum working voltage of the system of the device to be charged; and
   the buck circuit is further configured to:
   decrease the second voltage into the power supply voltage for the system of the device to be charged.

10. The charging control circuit of claim 8, wherein the charging management circuit further comprises a boost circuit and the boost circuit is configured to:
   increase the input voltage received from the power supply device when the input voltage is lower than total voltage of the plurality of cells.

* * * * *